United States Patent
Li

(10) Patent No.: US 12,087,100 B2
(45) Date of Patent: Sep. 10, 2024

(54) MONITORING SYSTEM FOR MONITORING STATUS OF WHEELS AND MONITORING METHOD USING SAME

(71) Applicant: Century Technology (Shenzhen) Corporation Limited, Shenzhen (CN)

(72) Inventor: Yong Li, Shenzhen (CN)

(73) Assignee: Century Technology (Shenzhen) Corporation Limited, Shenzhen (CN)

(*) Notice: Subject to any disclaimer, the term of this patent is extended or adjusted under 35 U.S.C. 154(b) by 383 days.

(21) Appl. No.: 17/392,542

(22) Filed: Aug. 3, 2021

(65) Prior Publication Data

US 2022/0068045 A1     Mar. 3, 2022

(30) Foreign Application Priority Data

Aug. 28, 2020   (CN) .......................... 202010887932.8

(51) Int. Cl.
    *G07C 5/00*     (2006.01)
    *G01B 21/16*     (2006.01)
    *G07C 5/08*     (2006.01)

(52) U.S. Cl.
    CPC ............. *G07C 5/008* (2013.01); *G01B 21/16* (2013.01); *G07C 5/0808* (2013.01)

(58) Field of Classification Search
    CPC ... G01M 17/013; G07C 5/0808; G07C 5/008; G01B 21/16; B60G 17/018; G01S 13/60
    USPC ....................................................... 701/34.2
    See application file for complete search history.

(56) References Cited

U.S. PATENT DOCUMENTS

| | | | | |
|---|---|---|---|---|
| 5,793,285 | A * | 8/1998 | Wehinger | B60C 23/067 73/146 |
| 7,944,348 | B2 * | 5/2011 | Watasue | B60C 23/0416 340/447 |
| 2003/0121319 | A1 * | 7/2003 | Kojima | B60C 23/061 73/146.2 |
| 2010/0114428 | A1 * | 5/2010 | Kurata | G01M 17/013 701/36 |
| 2011/0210841 | A1 * | 9/2011 | Wang | B60C 23/061 340/443 |
| 2011/0248861 | A1 * | 10/2011 | Corrado | G01G 19/08 33/701 |

(Continued)

FOREIGN PATENT DOCUMENTS

| | | | | |
|---|---|---|---|---|
| CN | 108534705 | A * | 9/2018 | ............ G01B 11/22 |
| JP | 2012193041 | A * | 10/2012 | |

(Continued)

*Primary Examiner* — Todd Melton
*Assistant Examiner* — Vincent Feng
(74) *Attorney, Agent, or Firm* — ScienBiziP, P.C.

(57) ABSTRACT

A system for monitoring status of individual wheels in a tracked or free-moving transportation carriage or device. The monitoring system includes at least one sensor per wheel, a data processor, and an upper computer. Each wheel includes a point of contact with the chassis, the at least one sensor is configured to monitor a distance D from that contact point to the ground or track. The data processor receives signals as to the distance D. The data processor determines whether any wheel is abnormal according to the distance D. The data processor generates a real-time warning if any wheel is found abnormal in, for example, size or shock-absorbing performance, a method using the system is also disclosed.

14 Claims, 3 Drawing Sheets

(56) References Cited

U.S. PATENT DOCUMENTS

| | | | |
|---|---|---|---|
| 2016/0327454 A1* | 11/2016 | Onda | B60B 17/0003 |
| 2017/0030806 A1* | 2/2017 | Lee | G01B 11/22 |
| 2021/0094376 A1* | 4/2021 | Smith | B60W 40/10 |
| 2021/0199791 A1* | 7/2021 | Podkamien | B60C 23/067 |
| 2022/0068045 A1* | 3/2022 | Li | G01B 21/16 |

FOREIGN PATENT DOCUMENTS

| | | |
|---|---|---|
| KR | 20000001076 U | 1/2000 |
| TW | M259718 U | 3/2005 |

\* cited by examiner

MONITORING SYSTEM FOR MONITORING STATUS OF WHEELS AND MONITORING METHOD USING SAME

FIELD

The subject matter herein generally relates to a field of monitoring, and particularly to a monitoring system for monitoring status of wheels and a monitoring method using same.

BACKGROUND

Automatic transportation devices are common in a clean room of a workshop for carrying objects. The automatic transportation device includes multiple wheels to roll on the ground and often to follow a track laid in the ground. The wheels are usually covered with a layer of polyurethane (PU). Due to a long-term wear or extrusion, the layer of PU may be worn off or fall from the wheels, which may cause a deviation or a derailment of the transportation device, damaging the objects being transported. The status of these wheels can be manually monitored from time to time, but such an inspection method may be prone to errors.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
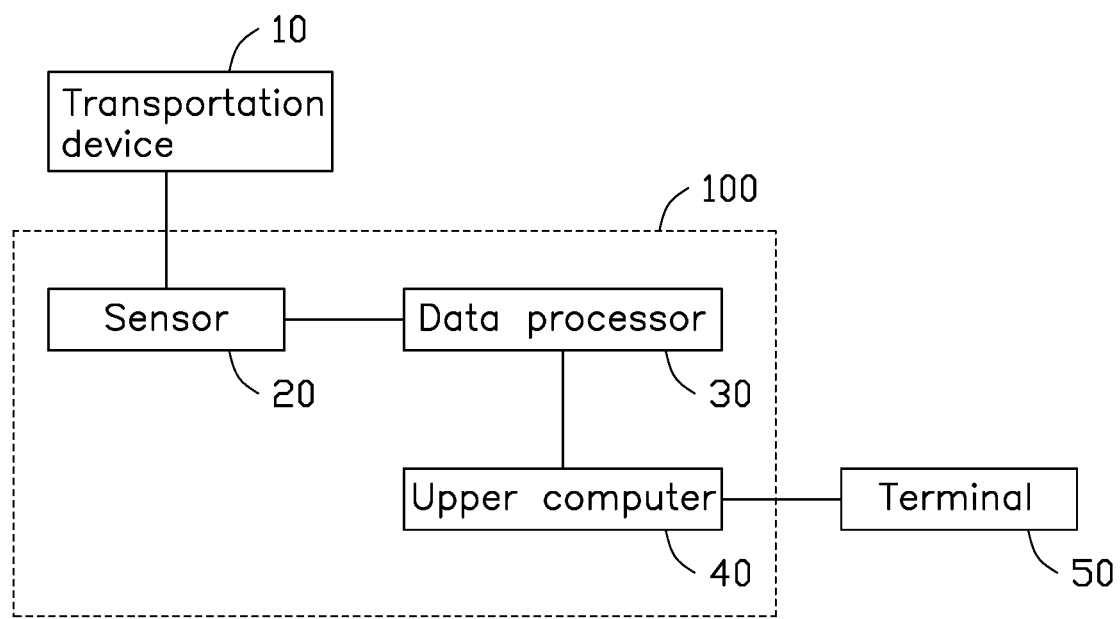
FIG. 1 is a module diagram of a monitoring system according to an embodiment of the disclosure.

It will be appreciated that for simplicity and clarity of illustration, where appropriate, reference numerals have been repeated among different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

Embodiment 1

Figure 2:
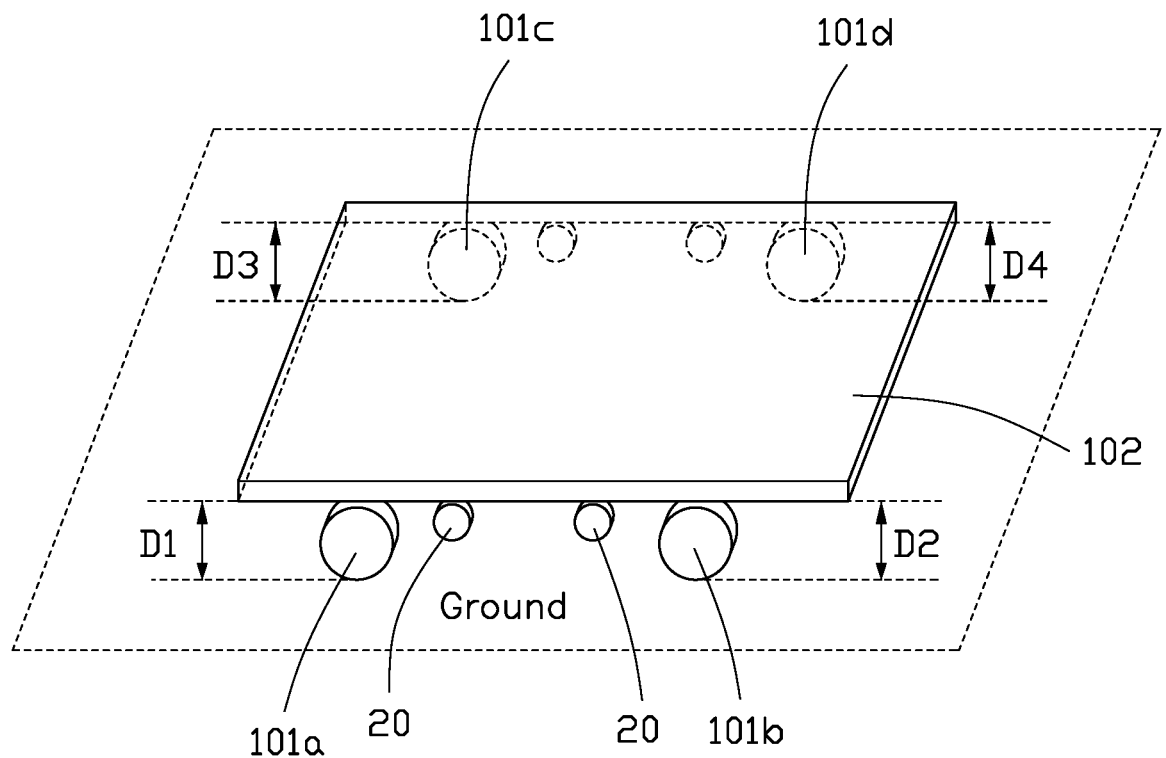
FIG. 2 is a schematic diagram of a transportation device according to an embodiment of the disclosure.

FIG. 1 shows a monitoring system 100 and FIG. 2 shows a transportation device 10. The transportation device 10 includes a plurality of wheels 101. The monitoring system 100 is configured to monitor the wheels 101 and determine whether the wheels 101 are abnormal in size or performance. The monitoring system 100 includes at least one sensor 20, a data processor 30, and an upper computer 40.

The transportation device 10 may be an automatic transportation device. The transportation device 10 is an automatic transportation carriage in the present embodiment. The transportation device 10 may move directly on the ground or on a track. The transportation device 10 moves on the ground in the present embodiment. The transportation device 10 includes a chassis 102 and the plurality of wheels 101 rotatably connected to the chassis 102. The chassis 102 can carry objects. The objects are display panels in the present embodiment. The objects are not limited to being display panels.

Each wheel 101 has a contact point with the chassis 102. A distance from the contact point to the ground is defined as a distance D. The at least one sensor 20 is on the chassis 102 and is close to the wheels 101. The at least one sensor 20 is configured to monitor the distance D. The at least one sensor 20 may be at other position in another embodiment of the present disclosure. The data processor 30 communicates with the at least one sensor 20 and receives signals of the distance D. The data processor 30 determines whether the wheels 101 are abnormal according to the signals of the distance D. The data processor 30 is configured to generate abnormal information if any wheel 101 is abnormal. The upper computer 40 communicates with the data processor 30 for receiving the abnormal information and sending the abnormal information to a terminal 50. The terminal 50 can show the abnormal information to users. The terminal 50 can be a smart phone, a computer, or a display panel. The abnormal information indicate that at least one wheel 101 is worn or has lost shock-absorbing properties for example.

The monitoring system 100 monitors status of the wheels 101 in the transportation device 10 in real time, making the users can know about the status of the wheels 101 in real time. A wheel 101 can thus be repaired in timely manner if the wheel 101 is abnormal, which can reduce damage to the objects.

In the present embodiment, the data processor 30 wirelessly communicates with the at least one sensor 20 and the upper computer 40. The data processor 30 may communicate with the at least one sensor 20 and the upper computer 40 by other ways in another embodiment of the present disclosure. For example, the data processor 30 may connect to the at least one sensor 20 and the upper computer 40 by conductive wires.

In the present embodiment, the upper computer 40 may be a personal computer.

In the present embodiment, the at least one sensor 20 includes a plurality of sensors 20. A number of the sensors 20 is equal to a number of the wheels 101. Each sensor 20 is configured to monitor the distance D of one wheel 101. Therefore, the monitoring system 100 can monitor the status of all the wheels 101 in real time.

In the present embodiment, the data processor 30 is set with a predetermined value A. The data processor 30 determines whether the wheels 101 are abnormal according to differences of the distance D of every two of the wheels 101. The data processor 30 determines that at least one wheel 101 is abnormal if an absolute value of any of the differences is greater than the predetermined value A. The data processor 30 is further configured to generate the abnormal information and send the abnormal information to the upper computer 40 if at least one of the wheels 101 are abnormal.

Referring to FIG. 2, the transportation device 10 includes four wheels 101, that are wheel 101a, wheel 101b, wheel 101c, and wheel 101d. A distance from the contact point of the wheel 101a to the ground is defined as distance D1, a distance from the contact point of the wheel 101b to the ground is defined as distance D2, a distance from the contact point of the wheel 101c to the ground is defined as distance D3, and a distance from the contact point of the wheel 101d to the ground is defined as distance D4. The transportation device 10 includes four sensors 20. Each distance D1, D2, D3, and D4 is monitored by one of the four sensors 20. The data processor 30 is configured to calculate differences between every two of these distances. At least one of the four wheels 101 is deemed abnormal if an absolute value of any of the differences is greater than the predetermined value A. The data processor 30 is used to generate the abnormal information if at least one of the four wheels 101 is abnormal. The upper computer 40 is configured to receive the abnormal information and send the abnormal information to the terminal 50 by mail or message, so the users can stop the transport device 10 to work and can check and repair the wheels 101a, 101b, 101c and 101d in time. In the present embodiment, the predetermined value A is 2 mm. The predetermined value A is not limited to being 2 mm in another embodiment of the present disclosure.

In the present embodiment, each of the four sensors 20 is a displacement sensor.

In the present embodiment, the transportation device 10 is an automatic transportation device. The automatic transport device is an automatic transport carriage.

In the present embodiment, the monitoring system 100 is used in a clean room where the transportation device 10 is used to transport the display panels.

Embodiment 2

Referring to FIG. 1 and FIG. 2, the sensors 20, the data processor 30, and the upper computer 40 of the present embodiment are the same as those elements in the first embodiment. The difference between the second embodiment and the first embodiment is that the data processor 30 is set with a predetermined value B in the second embodiment. In the present embodiment, each wheel 101 has an initial distance value generated according to a diameter of the wheel 101, wherein the initial distance value is equal to the diameter of the wheel 101. Each wheel 101 has a difference between the initial distance value and the distance D to the ground. The data processor 30 determines whether the wheels 101 are abnormal according to the predetermined value B, the initial distance value, and the distance D. That is, the data processor 30 determines whether a wheel 101 is abnormal according to the differences of the wheels 101. If any one of the differences is greater than the predetermined value B, the data processor 30 is configured to generate the abnormal information and send the abnormal information to the upper computer 40.

Referring to FIG. 2, the transportation device 10 includes four wheels 101 labelled wheel 101a, wheel 101b, wheel 101c, and wheel 101d. A distance from the contact point of the wheel 101a to the ground is defined as distance D1, a distance from the contact point of the wheel 101b to the ground is defined as distance D2, a distance from the contact point of the wheel 101c to the ground is defined as distance D3, and a distance from the contact point of the wheel 101d to the ground is defined as distance D4. The transportation device 10 includes four sensors 20. Each of the distances D1, D2, D3, and D4 is monitored by one of the four sensors 20. The data processor 30 is configured to calculate differences between every two of these distances. At least one of the four wheels 101 is deemed abnormal if an absolute value of any of the differences is greater than the predetermined value A. The data processor 30 is used to generate the abnormal information if at least one of the four wheels 101 is abnormal. The upper computer 40 is configured to receive the abnormal information and send the abnormal information to the terminal 50 by mail or message, so the users can stop the transport device 10 to work and can check and repair the wheels 101a, 101b, 101c and 101d in time. In the present embodiment, the predetermined value B is 2 mm. The predetermined value B is not limited to being 2 mm in other embodiment of the present disclosure.

Figure 3:
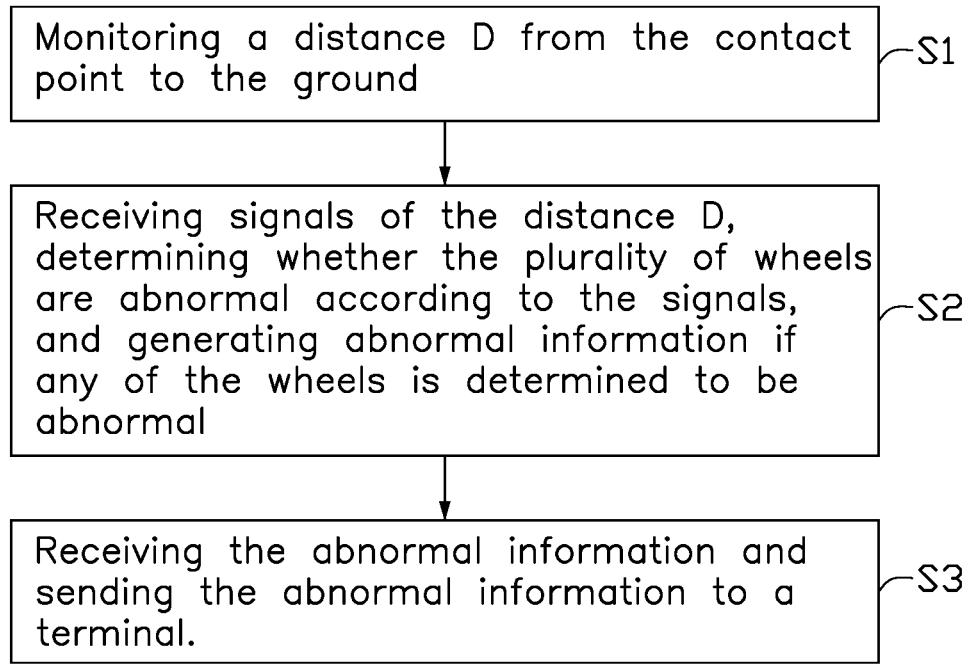
FIG. 3 is flow chart of a monitoring method applicable in the monitoring system shown in FIG. 1.

FIG. 3 shows a monitoring method applicable in the monitoring system 100.

The monitoring method includes:

Block S1, monitoring a distance D from the contact point to the ground;

Block S2, receiving signals of the distance D, determining whether the plurality of wheels are abnormal according to the signals, and generating abnormal information if any of the wheels is determined to be abnormal;

Block S3, receiving the abnormal information and sending the abnormal information to a terminal.

In the present embodiment, monitoring a distance D comprises monitoring the distance D of each of the plurality of wheels 101. The data processor 30 is set with a predetermined value A, wherein determining whether the plurality of wheels are abnormal according to the signals includes:

Determining whether the plurality of wheels 101 are abnormal according to differences of the distance D between every two of the plurality of wheels 101, if an absolute value of the difference is greater than the predetermined value A, determining that at least one of the plurality of wheels 101 is abnormal.

In another embodiment of the present disclosure, the data processor 30 is set with a predetermined value B. Determining whether the plurality of wheels are abnormal according to the signals and generating abnormal information if any of the wheels is abnormal includes:

generating an initial value according to a diameter of each of the plurality of wheels 101, determining whether the plurality of wheels 101 are abnormal according to the initial value and the distance D, and generating the abnormal information if an absolute value of an difference between the distance D and the initial value is greater than the predetermined value B.

The monitoring system 100 for monitoring the wheels 101 has a simple structure and can monitor the status of the wheels 101 in real time, which achieves a high detection efficiency and reduces the damage to the objects caused by an abnormality of the wheels 101.

It is to be understood, even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A monitoring system for monitoring status of a plurality of wheels in a transportation device, the transportation device configured for transporting display panels in a clean room and comprising a chassis and the plurality of wheels rotatably connected to the chassis, the monitoring system comprising:
- at least one sensor on the chassis, each of the plurality of wheels comprising a contact point contacting the chassis, the at least one sensor being configured to monitor a distance D from the contact point of each of the plurality of wheels to the ground;
- a data processor communicable with the at least one sensor for receiving signals of the distance D from the at least one sensor, the data processor being configured to determine whether the plurality of wheels are absorbing shock according to the received signals, and generate abnormal information if any of the plurality of wheels is determined to not absorbing shock; and
- an upper computer communicable with the data processor for receiving the abnormal information and sending the abnormal information to a terminal.

2. The monitoring system of claim 1, wherein the at least one sensor comprises a plurality of sensors each corresponding to one of the plurality of wheels, each of the plurality of sensors is configured to monitor the distance D of the corresponding one of the plurality of wheels.

3. The monitoring system of claim 2, wherein the data processor is further configured to determine whether the plurality of wheels are abnormal according to differences of the distance D of every two of the plurality of wheels; wherein
- if an absolute value of any one of the differences is greater than a predetermined value, the data processor is configured to determine that at least one of the plurality of wheels is abnormal.

4. The monitoring system of claim 3, wherein the predetermined value is 2 mm.

5. The monitoring system of claim 2, wherein each of the plurality of wheels has an initial distance value according to a diameter of each of the plurality of wheels, the data processor is configured to determine whether the plurality of wheels are abnormal according to the initial distance value and the distance D; and
- wherein each of the plurality of wheels has a difference between the distance D and the initial value, the data processor is configured to detect the difference and to generate the abnormal information if an absolute value of the difference of any one of the plurality of wheels is greater than a predetermined value.

6. The monitoring system of claim 5, wherein the initial distance value is equal to the diameter of each of the plurality of wheels.

7. The monitoring system of claim 5, wherein the predetermined value is 2 mm.

8. The monitoring system of claim 1, wherein the data processor wirelessly communicates with the at least one sensor and the upper computer.

9. The monitoring system of claim 1, wherein each of the at least one sensor is a displacement sensor.

10. The monitoring system of claim 1, wherein the at least one sensor comprises four sensors.

11. A monitoring method applicable in a monitoring system, the monitoring system being configured for monitoring status of a plurality of wheels in a transportation device, the transportation device configured for transporting display panels in a clean room and comprising a chassis and the plurality of wheels on the chassis, each of the plurality of wheels comprising a contact point contacting the chassis, the monitoring method comprising:
- monitoring a distance D from the contact point to the ground;
- receiving signals of the distance D, determining whether the plurality of wheels are absorbing shock according to the signals, and generating abnormal information if any of the wheels is determined to not absorbing shock; and
- receiving the abnormal information and sending the abnormal information to a terminal.

12. The monitoring method of claim 11, wherein monitoring the distances D comprises monitoring the distance D of each of the plurality of wheels.

13. The monitoring method of claim 12, determining whether the plurality of wheels are abnormal according to the signals comprises:
- determining whether the plurality of wheels are abnormal according to differences of the distance D of every two of the plurality of wheels, wherein if an absolute value of the difference is greater than a predetermined value, determining that at least one of the plurality of wheels is abnormal.

14. The monitoring method of claim 12, determining whether the plurality of wheels are abnormal according to the signals comprising generating an initial value according to a diameter of each of the plurality of wheels, determining whether the plurality of wheels are abnormal according to the initial value and the distance D; and
- generating abnormal information if any of the wheels is abnormal comprising generating the abnormal information if an absolute value of a difference between the distance D and the initial value is greater than a predetermined value.

* * * * *